United States Patent
Sung et al.

(10) Patent No.: US 11,514,692 B2
(45) Date of Patent: Nov. 29, 2022

(54) METHOD AND APPARATUS FOR BUILDING IMAGE MODEL

(71) Applicant: Samsung Electronics Co., Ltd., Suwon-si (KR)

(72) Inventors: Jae Mo Sung, Hwaseong-si (KR); Changhyun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 16/452,879

(22) Filed: Jun. 26, 2019

(65) Prior Publication Data
US 2020/0005098 A1 Jan. 2, 2020

(30) Foreign Application Priority Data
Jul. 2, 2018 (KR) .................. 10-2018-0076226

(51) Int. Cl.
*G06V 30/194* (2022.01)

(52) U.S. Cl.
CPC .................. *G06V 30/194* (2022.01)

(58) Field of Classification Search
CPC ........ G06K 9/66; G06K 9/627; G06K 9/6262; G06V 30/194; G06V 10/454; G06V 10/82; G06N 3/0454; G06N 3/08; G06N 3/04
See application file for complete search history.

(56) References Cited

U.S. PATENT DOCUMENTS

| | | | |
|---|---|---|---|
| 6,337,568 B1 | 1/2002 | Tutunji et al. | |
| 8,698,906 B2 | 4/2014 | Imade | |
| 9,020,302 B2 | 4/2015 | Shmunk | |
| 9,224,068 B1 | 12/2015 | Ranzato | |
| 9,418,319 B2 | 8/2016 | Shen et al. | |
| 9,728,184 B2 | 8/2017 | Xue et al. | |
| 9,836,820 B2 | 12/2017 | Tuzel et al. | |
| 10,229,356 B1* | 3/2019 | Liu | ........... G10L 15/16 |
| 2006/0010089 A1* | 1/2006 | Goodnight | ............... G06N 3/08 706/21 |
| 2012/0233127 A1* | 9/2012 | Solmer | ............... G06F 16/3347 707/661 |
| 2014/0072242 A1 | 3/2014 | Wei et al. | |
| 2015/0304667 A1 | 10/2015 | Suehring et al. | |
| 2015/0324686 A1* | 11/2015 | Julian | ...................... G06N 3/08 706/25 |
| 2016/0217369 A1* | 7/2016 | Annapureddy | ........ G06N 3/082 |
| 2017/0193680 A1 | 7/2017 | Zhang et al. | |
| 2017/0261538 A1 | 9/2017 | Kamilov et al. | |

(Continued)

FOREIGN PATENT DOCUMENTS

| | | |
|---|---|---|
| KR | 10-1791573 B1 | 10/2017 |
| KR | 10-2018-0010950 A | 1/2018 |

OTHER PUBLICATIONS

Huang, Xun et al., "Stacked Generative Adversarial Networks", 2017 IEEE Conference on Computer Vision and Pattern Recognition (CVPR), Apr. 12, 2017 (pp. 1866-1875).

(Continued)

*Primary Examiner* — Qun Shen
(74) *Attorney, Agent, or Firm* — NSIP Law

(57) ABSTRACT

A method and apparatus for building an image model, where the apparatus generates a target image model that includes layers duplicated from a layers of a reference image model and an additional layer, and trains the additional layer.

22 Claims, 10 Drawing Sheets

(56) References Cited

U.S. PATENT DOCUMENTS

| | | | |
|---|---|---|---|
| 2018/0144465 A1* | 5/2018 | Hsieh | G06N 3/08 |
| 2018/0307983 A1* | 10/2018 | Srinivasa | G06N 3/08 |
| 2018/0341872 A1* | 11/2018 | Wang | G06V 10/82 |
| 2019/0030371 A1* | 1/2019 | Han | G16H 50/20 |
| 2019/0251723 A1* | 8/2019 | Coppersmith, III | G06N 3/0454 |
| 2019/0279036 A1* | 9/2019 | Pan | G06K 9/6257 |
| 2020/0193299 A1* | 6/2020 | Geva | G06K 9/6272 |
| 2020/0311943 A1* | 10/2020 | Dai | G06K 9/6232 |

OTHER PUBLICATIONS

Karras, Tero, et al., "Progressive Growing of GANs for Improved Quality, Stability, and Variation", *arXiv preprint arXiv:1710.10196*, Feb. 26, 2018 (pp. 1-26).

Howard, Jeremy, "Training Imagenet in 3 hours for $25; and CIFAR10 for $0.26", *Fast.ai*, May 2, 2018 (pp. 1-12).

Extended European Search Report dated Jul. 12, 2019 in counterpart European Patent Application No. 19156688.4 (9 pages in English).

\* cited by examiner

METHOD AND APPARATUS FOR BUILDING IMAGE MODEL

CROSS-REFERENCE TO RELATED APPLICATIONS

This application claims the benefit under 35 USC § 119(a) of Korean Patent Application No. 10-2018-0076226, filed on Jul. 2, 2018, in the Korean Intellectual Property Office, the entire disclosure of which is incorporated herein by reference for all purposes.

BACKGROUND

1. Field

The following description relates to training an image model.

2. Description of Related Art

To address an issue of classifying an input pattern as a group, research is being conducted on trying to apply an efficient pattern recognition method to an actual computer. The research includes research on an artificial neural network (ANN) obtained by modeling pattern recognition characteristics using mathematical expressions. To address the above issue, the ANN employs an algorithm that mimics learning an ability to learn. The ANN generates mapping between input patterns and output patterns using the algorithm, which indicates that the ANN has a learning capability. Also, the ANN has a generalization capability to generate a relatively correct output with respect to an input pattern that was not used for training based on a result of the training.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of building an image model, the method including generating a target image model including an additional layer and remaining layers that are same as layers of a reference image model and, and training the additional layer of the target image model based on the reference image model.

The generating of the target image model may include generating the target image model by connecting the additional layer to a layer located on an input side of the remaining layers in the target image model.

The generating of the target image model may include initializing the additional layer by assigning a random value to each nodes of the additional layer.

The training of the additional layer may include determining a reference model output from an image with a converted training input, based on the reference image model, and training the target image model based on the reference model output.

The determining of the reference model output may include generating a conversion image by converting the training input based on an input layer of the reference image model, and computing the reference model output from the conversion image.

The training of the additional layer may include training the target image model based on a reference model output and a target model output that are based on the reference image model and the target image model, respectively.

The training of the additional layer may include computing an error based on the reference model output and the target model output, and updating a parameter of at least a portion of the remaining layers and the additional layer in the target image model based on the computed error.

The updating of the parameter may include repeating updating of the parameter until an error between the reference model output and the target model output converges.

The training of the additional layer may include updating a parameter of the additional layer.

The training of the additional layer may include updating a parameter of the additional layer while maintaining parameters of the remaining layers in the target image model.

The generating of the target image model may include generating the remaining layers of the target image model by duplicating parameters and a layer structure of the reference image model, and connecting the additional layer to the remaining layers.

The method may include updating parameters of the remaining layers and the additional layer in the target image model, in response to a completion of training of the additional layer.

A number of nodes in the additional layer may be greater than or equal to a number of nodes in one of the layers of the reference image model and is less than or equal to a number of nodes in an input layer of the target image model.

The method may include acquiring an input image, determining a label of the input image, and additionally training the target image model based on the input image and the label.

The determining of the label may include determining the label based on a user input associated with the acquiring of the input image.

The method may include generating an additional image model comprising an additional layer connected to the target image model, in response to a completion of training of the target image model, and training the additional layer of the additional image model based on an output of the target image model.

The target image model may be configured to receive an image with a resolution higher than an input resolution of the reference image model.

The training of the additional layer may include training the additional layer based on feature data output from at least a portion of the layers of the reference image model and feature data output from at least a portion of the remaining layers of the target image model.

The resolution of the image may be greater than a resolution of the conversion image.

A number of nodes in the additional layer may be greater than a number of nodes in any of the layers of the reference image model.

In another general aspect, there is provided an apparatus for building an image model, the apparatus including a processor configured to generate a target image model that includes an additional layer and remaining layers that are same as layers of a reference image model, and to train the additional layer of the target image model based on the reference image model, and a memory configured to store the trained target image model.

Other features and aspects will be apparent from the following detailed description, the drawings, and the claims.

Figure 1:
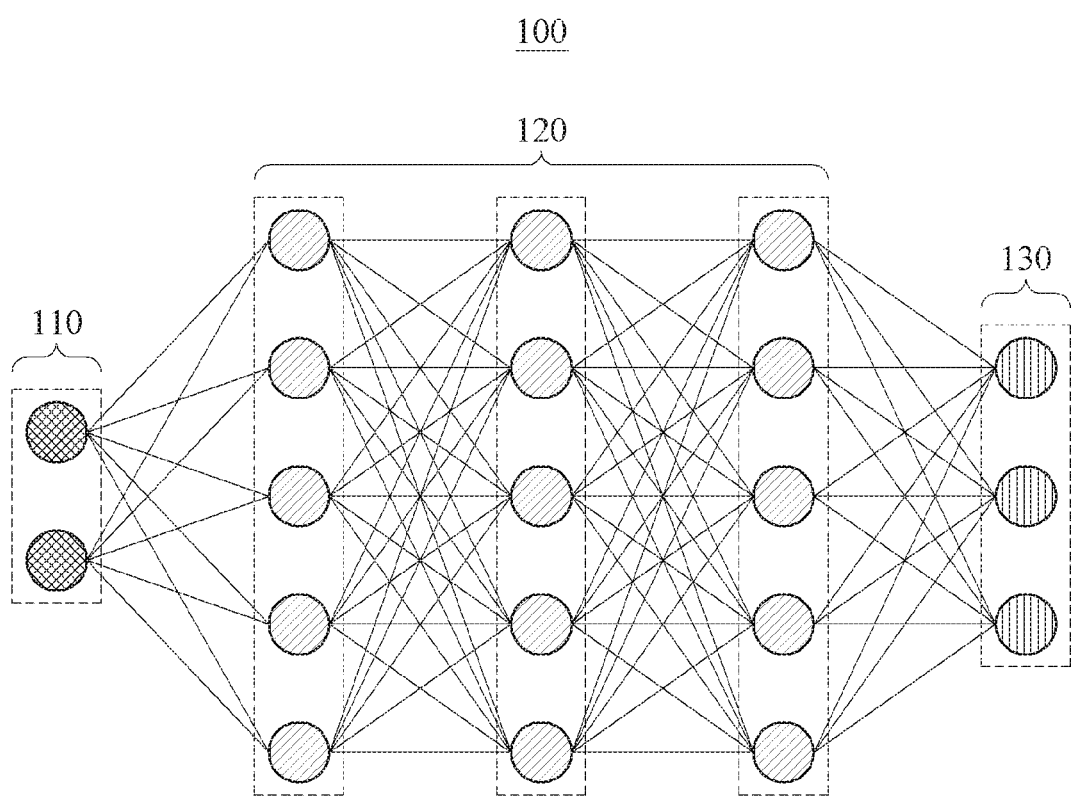
FIG. 1 illustrates an example of a configuration of an image model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various modifications may be made to the following examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms are intended to include the plural forms as well, unless the context clearly indicates otherwise. For example, the articles "a," "an," and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The use of the term 'may' herein with respect to an example or embodiment, e.g., as to what an example or embodiment may include or implement, means that at least one example or embodiment exists where such a feature is included or implemented while all examples and embodiments are not limited thereto.

Hereinafter, examples will be described in detail with reference to the accompanying drawings, and like reference numerals in the drawings refer to like elements throughout.

FIG. 1 illustrates an example of a configuration of an image model.

A neural network 100 corresponds to an example of a deep neural network (DNN) or an n-layer neural network. The DNN includes, for example, a fully connected network, a convolutional neural network (CNN), a deep convolutional network, or a recurrent neural network (RNN), a deep belief network, a bi-directional neural network, a restricted Boltzman machine, or may include different or overlapping neural network portions respectively with full, convolutional, recurrent, and/or bi-directional connections. The neural network 100 maps, based on deep learning, input data and output data that are in a non-linear relationship, to perform, for example, an object classification, an object recognition, a speech recognition or an image recognition. In an example, deep learning is a machine learning scheme to solve a problem such as a recognition of speech or images from a big data set. Through supervised or unsupervised learning in the deep learning, input data and output data are mapped to each other.

In the following description, a recognition includes a verification and an identification. The verification is an operation of determining whether input data is true or false, and the identification is an operation of determining which one of a plurality of labels is indicated by input data.

In an example, the neural network 100 may include an input source sentence (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network 100.

Referring to FIG. 1, the neural network 100 includes an input layer 110, a hidden layer 120, and an output layer 130. Each of the input layer 110, the hidden layer 120, and the output layer 130 includes a plurality of artificial neurons. An artificial neuron may be referred to as a "node".

For convenience of description, the hidden layer 120 includes three layers as shown in FIG. 1, however, example are not limited thereto, and the hidden layer 120 may include various number of layers without departing from the spirit and scope of the illustrative examples described. Although the neural network 100 includes a separate input layer to receive input data as shown in FIG. 1, in an example, the input data is directly input to the hidden layer 120. In the neural network 100, artificial neurons of layers other than the output layer 130 are connected to artificial neurons of a next layer via links to transmit output signals. A number of links corresponds to a number of artificial neurons included in the next layer. The links are referred to as "synapses".

To each of artificial neurons included in the hidden layer 120, an output of an activation function associated with weighted inputs of artificial neurons included in a previous layer is input. The weighted inputs are obtained by multiplying a synaptic weight to inputs of the artificial neurons included in the previous layer. The synaptic weight is referred to as a parameter of the neural network 100. The activation function includes, for example, a sigmoid function, a hyperbolic tangent (tan h) function, or a rectified linear unit (ReLU) function. A nonlinearity is formed in the neural network 100 by the activation function. To each of artificial neurons included in the output layer 130, weighted inputs of artificial neurons included in a previous layer are input.

When input data is provided, the neural network 100 calculates a function value based on a number of classes that are to be classified and recognized in the output layer 130 via the hidden layer 120, and classifies and recognizes the input data as a class having a greatest value among the classes. The neural network 100 may classify or recognize input data, and a classification and recognition process of the neural network 100 will be described as a recognition process below for convenience of description. The following description of the recognition process is equally applicable to a classification process without departing from the spirit of the present disclosure.

When a width and a depth of the neural network 100 are sufficiently large, the neural network 100 has a capacity large enough to implement an arbitrary function. When the neural network 100 learns a sufficiently large quantity of training data through an appropriate learning process, an optimal recognition performance is achieved.

In an example, the neural network 100 is embodied as an architecture having a plurality of layers including an input image, feature maps, and an output. In the neural network 100, a convolution operation is performed on the input image with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the neural network 100.

In the present disclosure, an image model has a machine learning structure that is trained to output a recognition result when an image is input. For example, the image model includes the above-described neural network 100, however, examples are not limited thereto. An image model building apparatus trains a grown image model. For example, an image model building technology is applied to a recognition of an object related to autonomous driving. The image model building apparatus trains an image model based on an image output from a camera installed in a vehicle, to effectively generate an image model that supports a high-resolution image.

The image model building apparatus is an apparatus for building an image model. For example, the image model building apparatus generates and trains a target image model based on a reference image model. An operation of building an image model includes an operation of generating and training an image model. An image recognition apparatus recognizes an input image based on an image model that is built. For example, the image recognition apparatus identifies an object appearing in the input image based on a built target image model. However, examples are not limited thereto, and the image model building apparatus is integrated with the image recognition apparatus.

Figure 2:
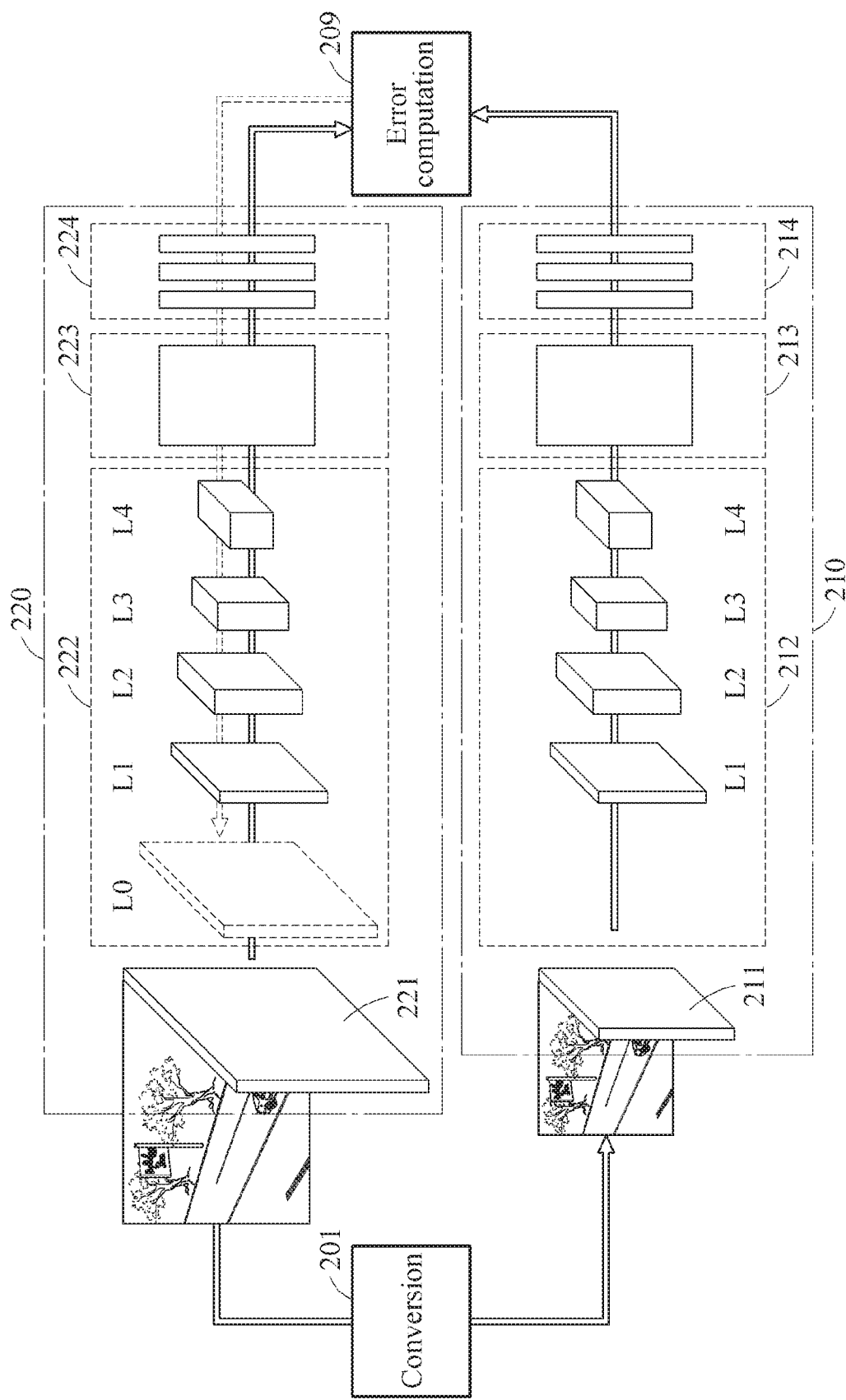
FIG. 2 illustrates an example of building a target image model based on a reference image model.

FIG. 2 illustrates an example of training a target image model based on a reference image model.

An image model includes a plurality of layers. A connection relationship between the plurality of layers varies depending on a design. In an example, a reference image model 210 is an original image model that is completely trained, and is designed to receive, as an input, an image with a first resolution. A target image model 220 is a new image model that is to be trained, and is designed to receive, as an input, an image with a second resolution. In an example, the second resolution is higher than the first resolution. An image model building apparatus generates and trains the target image model 220 based on the reference image model 210.

The reference image model 210 and the target image model 220 include input layers 211 and 221, convolutional layers 212 and 222, customized parts 213 and 223, and classifiers 214 and 224, respectively.

The input layers 211 and 221 are layers configured to receive input images. The input layer 221 of the target image model 220 receives an image with the second resolution, and the input layer 211 of the reference image model 210 receives an image with the first resolution. Thus, the target image model 220 is used to extract, recognize, and classify features of an image with a resolution higher than that of an image of the reference image model 210.

The convolutional layers 212 and 222 extract feature data from the input images. The feature data is data obtained by abstracting an input image, and is expressed as, for example, a feature vector. When a number of convolutional layers 212 and 222 increases, an abstraction level also increases. For example, when a number of convolutional layers included in an image model increases, an image recognition apparatus represents a feature of an input image with a higher resolution using the image model. However, when the number of convolutional layers 212 and 222 increases, a number of parameters that need to be trained also increase. When the number of parameters that need to be trained increases, a vanishing level of gradient information increases during training of an image model, thereby increasing the difficulty level of training the image model. The image model building apparatus effectively trains the image model while extending the convolutional layers 212 and 222.

The customized parts 213 and 223 are designed to solve a given problem. In an example, the customized parts 213 and 223 are region proposal networks (RPNs) in a faster region-based convolutional neural network (FR-CNN). In another example, the customized parts 213 and 223 are adversarial spatial dropout networks (ASDNs) in a generative adversarial network (GAN). In another example, the customized parts 213 and 223 are omitted based on a given problem.

The classifiers 214 and 224 classify classes of input data. For example, the classifiers 214 and 224 are networks to classify categories of objects appearing in an input image for object recognition. The classifiers 214 and 224 output information indicating an identification (ID) of an object. The classifiers 214 and 224 include fully-connected layers. However, when a final purpose of the image model is to extract a feature of an input image, the classifiers 214 and 224 are removed from the image model.

Although FIG. 2 shows four layers, that is, layers L1, L2, L3 and L4 as the convolutional layers 212 of the reference image model 210, a number of convolutional layers 212 is not limited thereto. A convolutional layer close to an input layer extracts a more detailed feature of the input image. The reference image model 210 is, for example, an image model that is completely trained based on training data that includes an image with a first resolution.

In FIG. 2, the target image model 220 has a structure that is formed by expanding the reference image model 210. For example, the convolutional layers 222 of the target image model 220 further include one additional layer, for example, a layer L0, in comparison to the convolutional layers 212 of the reference image model 210, however, a number of additional layers is not limited thereto. An example of efficiently training the target image model 220 that includes a larger number of parameters and a larger number of layers than those of the reference image model 210 will be described below.

The image model building apparatus trains the target image model 220 for a high-resolution image, based on the reference image model 210 that is trained based on a low-resolution image. For example, a camera sensor of an image recognition apparatus (for example, an autonomous vehicle) is changed to support a higher resolution. In this example, when the reference image model 210 is trained based on a low-resolution image, a performance (for example, a recognition rate) for a high-resolution image decreases.

The image model building apparatus acquires new training data. For example, the new training data includes a high-resolution image. The image model building apparatus generates a conversion image by converting the high-resolution image (for example, an image with a second resolution) of the new training data into an image with a low resolution (for example, a first resolution) in operation 201. The image model building apparatus computes an output based on the reference image model 210 from the conversion image. The image model building apparatus generates an output based on the target image model 220 from an input image of the new training data. In operation 209, the image model building apparatus computes an error from the output based on the reference image model 210 and the output based on the target image model 220. The image model building apparatus trains the target image model 220 based on the computed error. Examples of generating and training the target image model 220 will be further described below.

Figure 3:
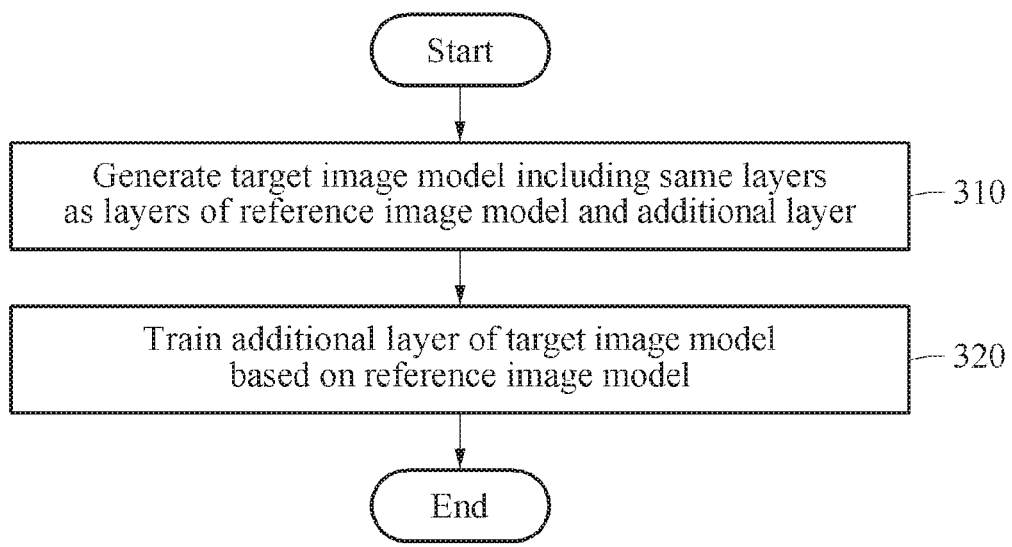
FIGS. 3 and 4 are diagrams illustrating examples of an image model building method.
Figure 4:
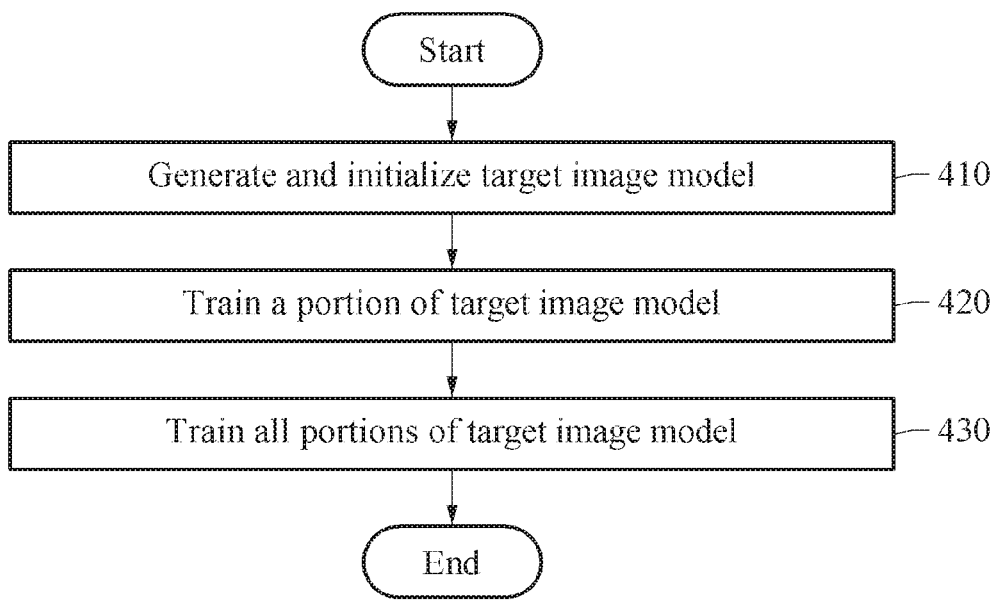

FIGS. 3 and 4 are diagrams illustrating examples of an image model building method.

FIG. 3 illustrates an example of an image model building method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, an image model building apparatus generates a target image model. In an example, the target image model includes the same layers as a plurality of layers of a reference image model, and an additional layer. In the present disclosure, the same layers as the layers of the reference image model are layers other than the additional layer in target image model, and are referred to as "remaining layers" in the present disclosure. The image model building apparatus generates remaining layers of the target image model by duplicating parameters and a layer structure of the reference image model. In an example, the image model building apparatus connects the additional layer to the remaining layers. For example, the image model building apparatus connects the additional layer to a layer (for example, the layer L1 of FIG. 2) located on an input side among a plurality of layers duplicated from the reference image model, to generate the target image model. However, a connection of the additional layer is not limited thereto.

For example, the target image model includes layers having the same parameters and the same structures as those of layers (for example, convolutional layers) included in the reference image model. A plurality of layers of the target image model duplicated from the reference image model are, for example, the layers L1, L2, L3, and L4 of FIG. 2. The target image model further includes an additional layer connected to the plurality of layers duplicated from the reference image model. The additional layer is, for example, the layer L0 of FIG. 2.

In operation 320, the image model building apparatus trains the additional layer of the target image model based on the reference image model. For example, the image model building apparatus trains the additional layer of the target image model based on an output that is computed from a training input based on the reference image model and an output that is computed from a training input based on the target image model. An training input in an image format is referred to as a training input image. In an example, the image model building apparatus maintains parameters of the remaining layers of the target image model while training the additional layer.

FIG. 4 illustrates another example of an image model building method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, an image model building apparatus generates and initializes a target image model. To generate the target image model, the image model building apparatus connects an additional layer to one layer (for example, a layer on an input side) from among layers (for example, remaining layers) that are duplicated from a reference image model. In an example, the image model building apparatus initializes the additional layer by assigning a random value to each of nodes of the additional layer in the target image model. In an example, the image model building apparatus assigns the same value as that of each of nodes in the reference image model to each of nodes of the layers duplicated from the reference image model.

In an example, a layer on an input side is a layer connected adjacent to an input layer among hidden layers of an arbitrary image model. For example, the layer on the input side is the layer L1 in the target image model 220 of FIG. 2.

In operation 420, the image model building apparatus trains a portion of the target image model. For example, the image model building apparatus trains the additional layer of the target image model by updating a parameter of the additional layer. In an example, the image model building apparatus maintains parameters of the remaining layers of the target image model while updating the parameter of the additional layer.

In operation 430, the image model building apparatus trains all portions of the target image model. For example, when training of the additional layer is completed, the image model building apparatus updates parameters of all layers in the target image model.

Thus, the image model building apparatus primarily trains the additional layer to output a result similar to that of the reference image model. The image model building apparatus secondarily trains both the additional layer and the remaining layers to output a more precise result than that of the reference image model.

An order of operations performed by the image model building apparatus is not limited to those of FIGS. 3 and 4. The order of the operations may vary depending on a design, or a portion of the operations may be omitted or added. Also, each of operations 410 through 430 of FIG. 4 will be further described below.

Figure 5:
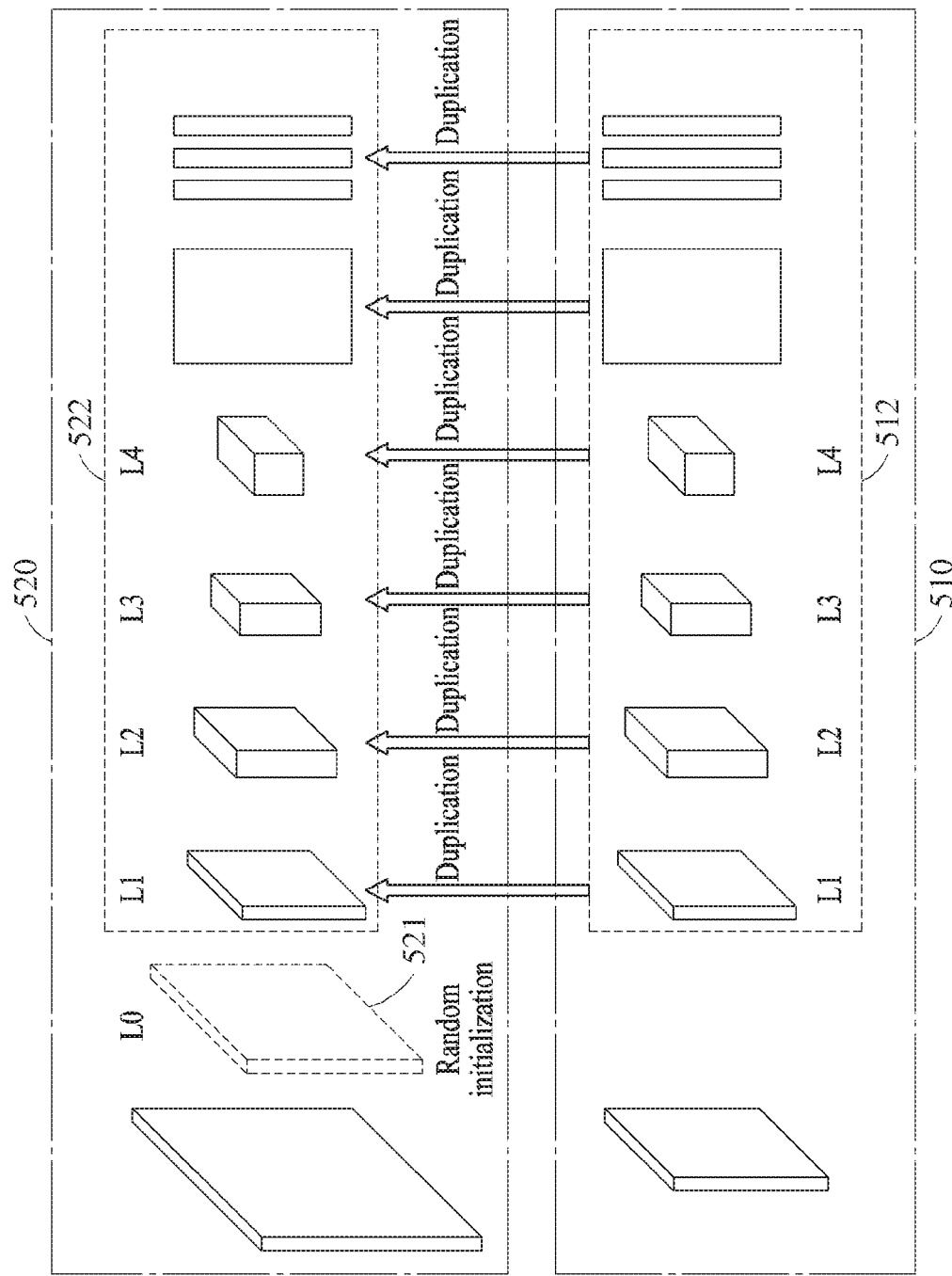
FIG. 5 illustrates an example of generating and initializing a target image model.

FIG. 5 illustrates an example of generating and initializing a target image model.

FIG. 5 illustrates an example of operation 410 of FIG. 4 to generate and initialize a target image model 520 in an image model building apparatus.

The image model building apparatus generates an additional layer 521 and remaining layers 522. The remaining layers 522 are layers having the same layer structure as that of a plurality of layers 512 of a reference image model 510. For example, the remaining layers 522 have a structure, for example, a classifier structure, together with convolutional layers L1, L2, L3 and L4 of the reference image model 510. The image model building apparatus connects the additional layer 521 to a portion of the remaining layers 522. For example, the image model building apparatus connects the additional layer 521 to a layer on an input side among the remaining layers 522. The additional layer 521 is indicated by, for example, L0 in FIG. 5. However, a connection of the additional layer 521 is not limited thereto.

In an example, the image model building apparatus generates the additional layer 521 configured to process data with a size greater than or equal to a data size that may be processed by a reference image model. For example, the image model building apparatus generates a target image model to receive an image with a resolution higher than an input resolution of the reference image model. In an example, the image model building apparatus generates an additional layer that includes a number of nodes that is greater than or equal to a number of nodes included in one layer (for example, a layer on an input side in the reference image model) of the reference image model and that is less than or equal to a number of nodes included in an input layer of the target image model. Thus, the image model building apparatus extracts detailed feature information about a high-resolution image, using an additional layer that includes a number of nodes greater than a number of nodes included in layers of the reference image model.

The image model building apparatus initializes the generated target image model 520. For example, the image model building apparatus sets a parameter of the target image model 520 to an initial value. The image model building apparatus determines the same parameters of the remaining layers 522 of the target image model 520 as those of a pre-trained reference image model 510 as initial parameters of the remaining layers 522. The image model building apparatus performs a random initialization of the additional layer 521. For example, the image model building apparatus determines a random value for the additional layer 521 as an initial parameter.

Thus, the target image model 520 includes the additional layer 521 that is randomly initialized, and the remaining layers 522 that are duplicated from the reference image model 510.

Figure 6:
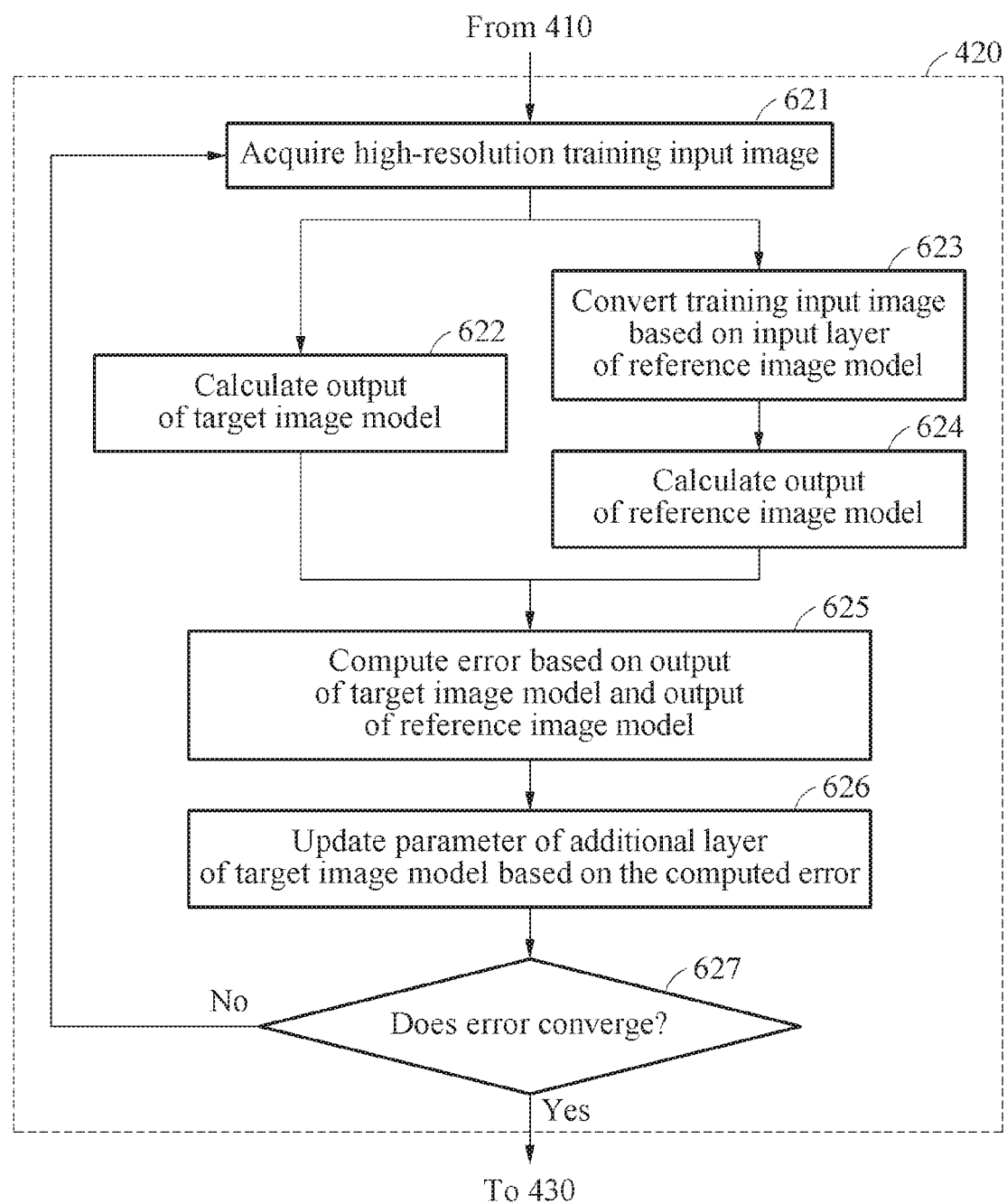
FIG. 6 is a diagram illustrating an example of training a target image model.

FIG. 6 is a diagram illustrating an example of training a target image model. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

FIG. 6 illustrates an example of operation 420 of FIG. 4 to train a portion of a target image model.

Referring to FIG. 6, in operation 621, an image model building apparatus acquires a high-resolution training input image. For example, the image model building apparatus acquires new training data with a high-resolution (for example, a second resolution).

The new training data is data used to train a target image model, and includes, for example, a training input image with the second resolution. The new training data represents an image of a higher resolution in comparison to the original training data indicating a first resolution. The new training data indicates the same object as an object included in the original training data, however, examples are not limited thereto. The new training data is data acquired regardless of the original training data. For example, the new training data further includes a label mapped to the training input image with the second resolution, however, examples are not limited thereto.

In operation 622, the image model building apparatus calculates an output of the target image model. For example, the image model building apparatus calculates a target model output from a training input with the second resolution based on the target image model. In an example, when the target image model is implemented as a neural network, the image model building apparatus computes the output of the target image model by forward propagating a training input from an input layer to an output layer of the target image model.

In operation 623, the image model building apparatus converts the training input image based on an input layer of a reference image model. The image model building apparatus generates a conversion image by converting a training input based on the input layer of the reference image model. For example, the image model building apparatus identifies a resolution that may be input to the reference image model, based on the input layer of the reference image model, and converts the training input image into an image with the identified resolution. The image model building apparatus converts the training input image with the second resolution into an image with the first resolution supported by the reference image model.

The image model building apparatus converts an image format of the training input image into an image format corresponding to the first resolution. For example, the image model building apparatus resizes the training input image or down-samples pixels included in the training input image, to convert the image format of the training input image. The conversion image is an image that has an image format into which the image format of the training input image is converted.

In operation 624, the image model building apparatus calculates an output of the reference image model. The image model building apparatus computes a reference model output from an input (for example, the conversion image) into which the training input is converted, based on the reference image model. For example, the image model building apparatus computes the reference model output by forward propagating the conversion image from the input layer and an output layer of the reference image model.

In operation 625, the image model building apparatus computes an error based on the output of the target image model and the output of the reference image model. The image model building apparatus trains the target image model based on the reference model output. The image model building apparatus computes an error based on the reference model output and the target model output. For example, the image model building apparatus calculates a loss function to train the target image model, based on at least one of the reference model output and the target model output. The loss function is a function indicating a difference between the reference model output and the target model output, such as, for example, a softmax loss function, or a cross-entropy loss function, however, the loss function is not limited thereto. For example, when training data includes a pair of a training input image and a training label, the loss function may be a function indicating a relationship between the target model output and the training label.

In operation 626, the image model building apparatus updates a parameter of an additional layer of the target image model based on the computed error. The image model building apparatus trains the target image model based on the reference model output and the target model output that are based on the reference image model and the target image model, respectively.

The image model building apparatus updates a parameter of at least a portion of layers of the target image model based on the computed error. For example, the image model building apparatus updates the parameter of the additional layer of the target image model, using a gradient-based back-propagation scheme. In this example, the image model building apparatus maintains parameters of remaining layers of the target image model while updating the parameter of the additional layer.

In operation 627, the image model building apparatus determines whether the error converges. The image model building apparatus repeats updating of the parameter until an error between the reference model output and the target model output converges. In an example, when the parameter of the additional layer is updated in the target image model, and when a change in the error between the reference model output and the target model output is less than or equal to a threshold, the image model building apparatus determines that the error converges. In another example, when a difference between an updated parameter and a parameter that is not updated is less than or equal to a threshold, the image model building apparatus determines that the error converges. When it is determined that the error does not converge, the image model building apparatus reverts to operation 621 and updates a parameter based on a new training input.

Thus, the image model building apparatus minimizes an error that is based on the reference image model and the target image model by repeating updating of the parameter of the additional layer.

The image model building apparatus minimizes a time and computational recourses used to train the target image model by restricting a target with a parameter to be updated to the additional layer. The image model building apparatus trains the target image model to have a recognition performance similar to that of the reference image model by minimizing an error between the reference model output and the target model output. Because a target for training is restricted to the additional layer, the image model building apparatus trains the target image model while robustly maintaining a recognition performance for a low-resolution image acquired from the reference image model.

Figure 7:
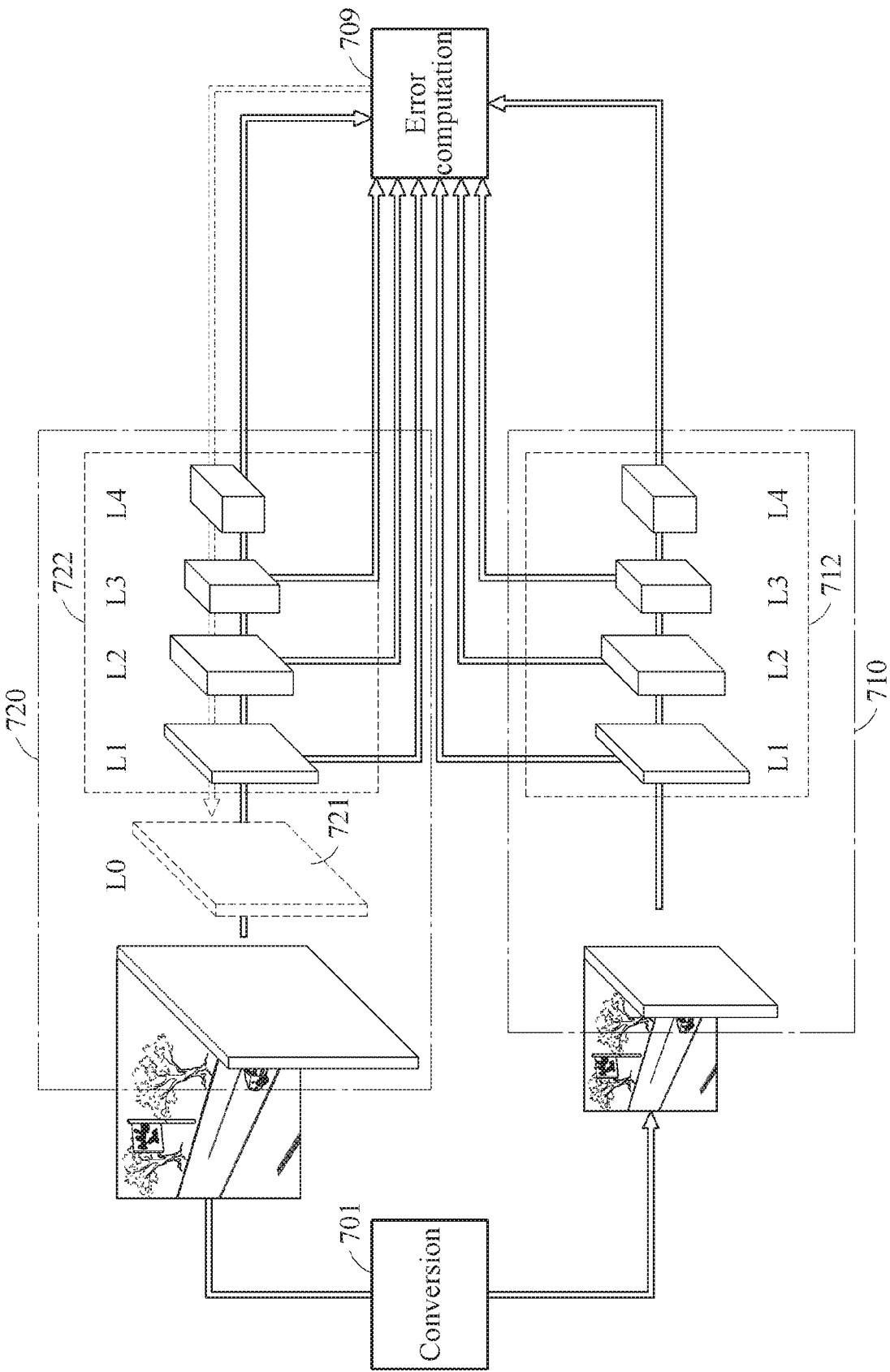
FIG. 7 illustrates an example of computing an error during training.

FIG. 7 illustrates an example of computing an error during training.

The error is computed based on the output of the target image model and the output of the reference image model in operations 625 and 626 of FIG. 6, however, examples are not limited thereto. For example, the image model building apparatus trains an additional layer 721 based on feature data output from at least a portion of layers of a reference image model 710 and feature data output from at least a portion of layers of a target image model 720. A conversion image input to the reference image model 710 is generated by converting a training input in operation 701.

Referring to FIG. 7, in operation 709, the image model building apparatus computes an error based on feature data of the reference image model 710 and feature data of the target image model 720. For example, the image model building apparatus computes the error using an auto-encoding scheme. The image model building apparatus computes the error based on a difference between feature data output from each of the layers of the reference image model 710 and feature data output from a layer of the target image model 720 corresponding to each of the layers of the reference image model 710. For example, the image model building apparatus computes an error based on a difference between features of layers L1, a difference between features of layers L2, a difference between features of layers L3, and a difference between features of layers L4. The layers L1, L2, L3 and L4 are included in the reference image model 710 and the target image model 720.

The image model building apparatus updates a parameter of the additional layer 721 based on a difference between features of a plurality of layers 712 of the reference image model 710 and features of remaining layers 722 of the target image model 720.

Figure 8:
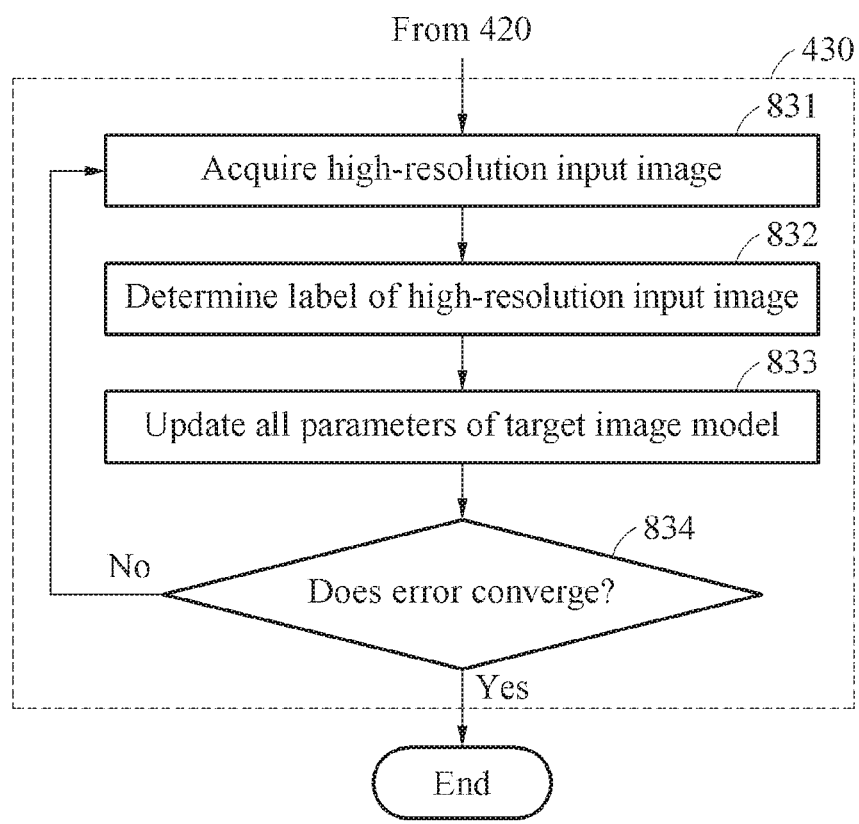
FIG. 8 illustrates an example of training all portions of a target image model.

FIG. 8 illustrates an example of training all portions of a target image model. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

FIG. 8 illustrates an example of operation 430 of FIG. 4 to train all portions of the target image model. When training of an additional layer is completed, an image model building apparatus updates parameters of all layers in the target image model.

Referring to FIG. 8, in operation 831, the image model building apparatus acquires a high-resolution input image. For example, the image model building apparatus acquires a new input image. The new input image corresponds to the training input image acquired in operation 621 of FIG. 6, however, examples are not limited thereto. The new input image is, for example, an image that is additionally acquired independently of the training input image. For example, when the image model building apparatus is included in an autonomous vehicle, the new input image is an image acquired when the autonomous vehicle is moving.

In operation 832, the image model building apparatus determines a label of the high-resolution input image. The image model building apparatus determines a label of a new input image with a second resolution.

In an example, when the target image model is a model for a classification task, the image model building apparatus generates ground truth label information for the new input image with the second resolution. In another example, when the target image model is a model to detect a size and a location of an object in an image, the image model building apparatus generates label information that indicates a size and a location of an object in the new input image. Also, the image model building apparatus uses label information that is manually input by an expert.

Also, the image model building apparatus determines a label of the new input image based on a user input associated with an acquisition of the new input image. For example, when the image model building apparatus is mounted in an autonomous vehicle, and when a driver finds an obstacle, the driver operates a brake pad. The image model building apparatus generates label information that is associated with a new input image acquired at a point in time at which a user input, such as a user operation of the brake pad, is acquired, and that indicates that a detected object is true. However, this is merely an example, and an automated generation of label information based on a user input may vary depending on a design.

However, when the target image model is designed for an unsupervised image domain translation task, operation 832 is not performed.

In operation 833, the image model building apparatus updates the parameters of the target image model. For example, the image model building apparatus additionally trains the target image model based on the new input image and the label. When the training of the additional layer is completed, the image model building apparatus updates all the parameters of the target image model, to fine tune the parameters of the target image model. The image model building apparatus computes an output based on the training image model from a training input image with a second resolution acquired in operations 831 and 832. The image model building apparatus computes an error based on the computed output and label information, and updates parameters of all the layers in the target image model based on a back-propagation scheme using the computed error.

In operation 834, the image model building apparatus determines whether the error converges. The image model building apparatus repeats training of all portions of the target image model until the error converges. In an example, when the error converges, the image model building apparatus terminates the training of the target image model. In another example, when the error does not converge, the image model building apparatus reverts to operation 831 and repeats the training of all the portions of target image model.

Thus, the image model building apparatus efficiently and robustly trains the target image model based on a lower quantity of training data using a pre-trained reference image model. Also, the image model building apparatus minimizes computational and temporal costs used to train the target image model.

Figure 9:
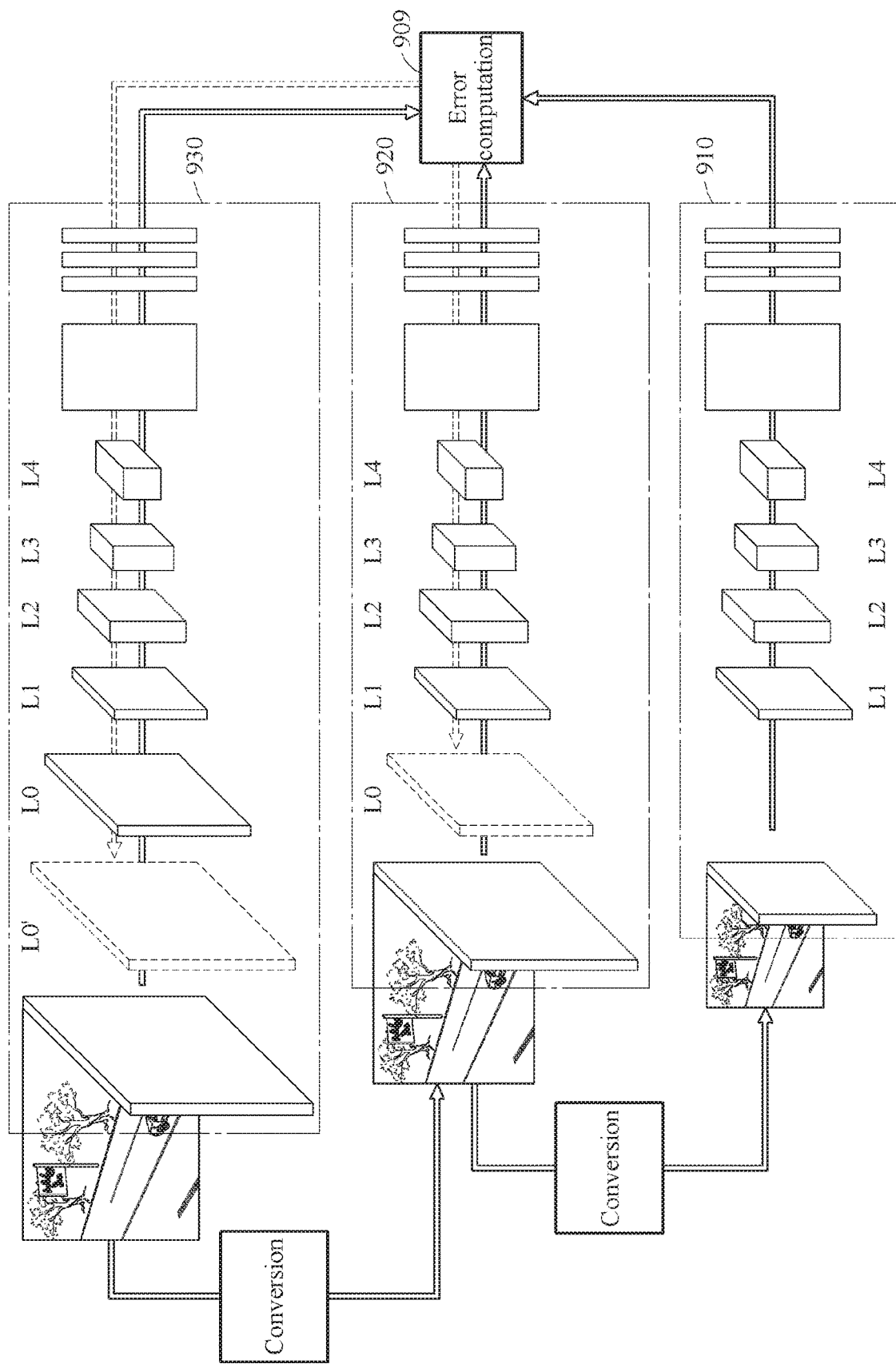
FIG. 9 illustrates an example of growing a target image model.

FIG. 9 illustrates an example of growing a target image model.

An image model building apparatus grows an image model that is generated by the operations described above with reference to FIGS. 1 through 8. For example, when training of a target image model 920 is completed, the image model building apparatus generates an additional image model 930 having an additional layer L0' connected to the target image model 920.

The image model building apparatus generates the target image model 920 by connecting an additional layer L0 to a plurality of layers (for example, layers L1 through L4) of the reference image model 910. The image model building apparatus generates the additional image model 930 by connecting the additional layer L0' to a plurality of layers (for example, the additional layer L0 and layers L1 through L4) of the target image model 920.

The image model building apparatus trains the additional layer L0' of the additional image model 930 based on an output of the target image model 920. The additional image model 930 is trained similarly to training of the target image model 920. For example, the image model building apparatus acquires a training input image with a third resolution, inputs the training input image to the additional image model 930, and computes a third temporary output. The image model building apparatus converts the training input image with the third resolution into an image with a second resolution, inputs the image with the second resolution to the target image model 920, and computes a second temporary output. The image model building apparatus converts the image with the second resolution into an image with a first resolution, inputs the image with the first resolution to the reference image model 910, and computes a first temporary output. The image model building apparatus computes an error based on any one or any combination of the first temporary output, the second temporary output and the third temporary output in operation 909. The image model building apparatus updates a parameter of the additional layer L0' of the additional image model 930 based on the computed error. The second resolution is higher than the first resolution, and the third resolution is higher than the second resolution.

The image model building apparatus grows an image model as described above, and thus it is possible to quickly and efficiently generate and train an image model for a resolution supported by a camera sensor even though a performance of the camera sensor changes.

A trained target image model that is installed in an image recognition apparatus. The image recognition apparatus acquires an input image, and generates a recognition result based on the target image model from the acquired input image. For example, the image recognition apparatus extracts feature data from the input image based on the target image model, or determines a label indicted by the input image. The image recognition apparatus recognizes an object appearing in the input image based on the target image model. When the image recognition apparatus is installed in a vehicle, the image recognition apparatus recognizes an obstacle appearing in the input image.

Figure 10:
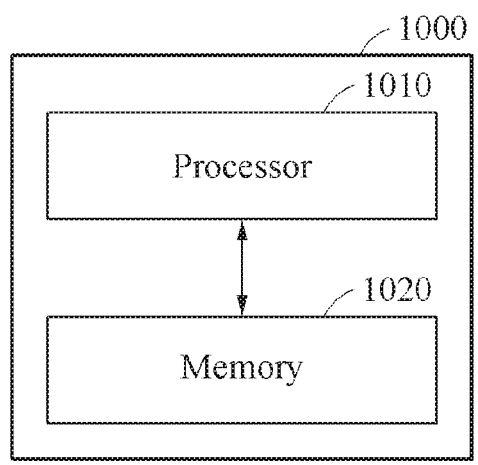
FIGS. 10 and 11 are diagrams illustrating examples of image model building apparatus.
Figure 11:
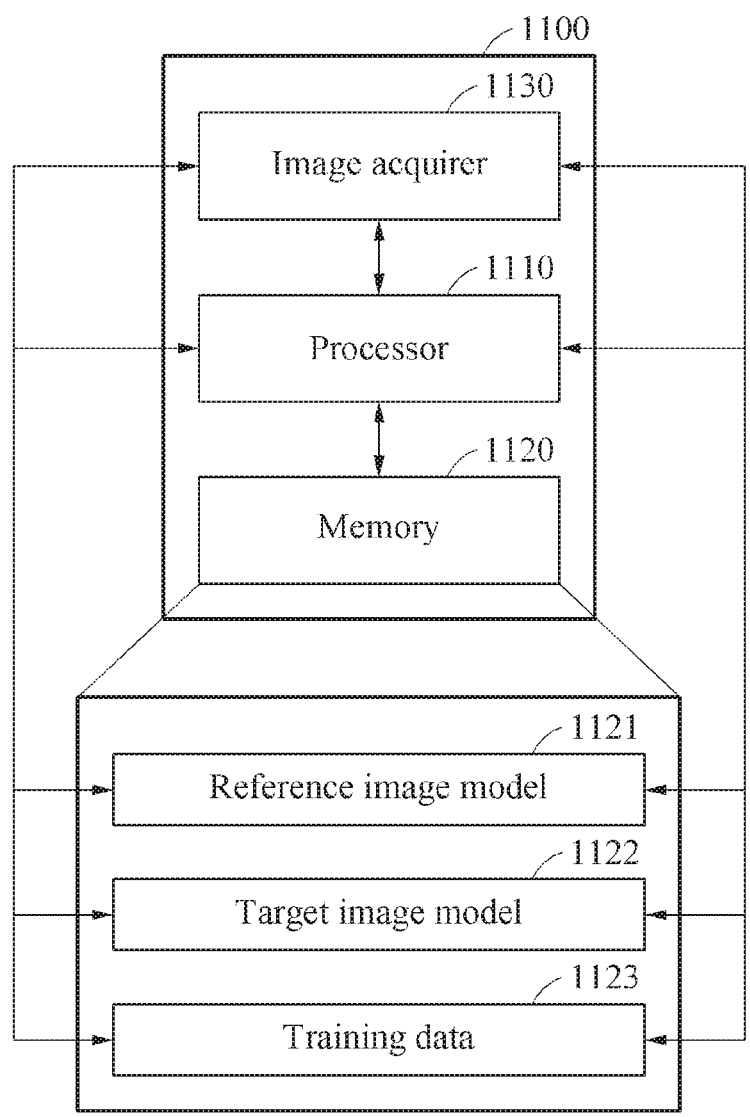

FIGS. 10 and 11 are diagrams illustrating examples of a configuration of an image model building apparatus.

FIG. 10 illustrates an example of a configuration of an image model building apparatus 1000. The image model building apparatus 1000 includes a processor 1010 and a memory 1020.

The processor 1010 generates a target image model that includes the same layers as layers of a reference image model, and an additional layer. Also, the processor 1010 trains the additional layer of the target image model based on the reference image model. However, operations of the processor 1010 are not limited thereto, and the processor 1010 performs at least a portion of the operations described above with reference to FIGS. 1 through 9. Further details of the processor 1010 are provided below.

The memory 1020 stores the trained target image model. Also, the memory 1020 stores the reference image model and an additional image model. Further details of the memory 1020 are provided below.

FIG. 11 illustrates an example of a configuration of an image model building apparatus 1100 configured to perform active leaning. The image model building apparatus 1100 includes a processor 1110, a memory 1120, and an image acquirer 1130.

The processor 1110 performs operations similar to that of the processor 1010 of FIG. 10. When a new input image is acquired by the image acquirer 1130, the processor 1110 generates and trains a target image model 1122 based on the new input image. For example, the processor 1110 generates label information associated with the new input image acquired by the image acquirer 1130, and trains the target image model 1122 based on the new input image and the generated label information. However, the operations of the processor 1110 are not limited thereto, and the processor 1110 performs an operation connected to at least a portion of the operations described above with reference to FIGS. 1 through 9.

The memory 1120 temporarily or permanently stores data used to train the target image model 1122. For example, the memory 1120 stores a reference image model 1121, the target image model 1122 and training data 1123. In an example, when training of the target image model 1122 is completed, the memory 1120 deletes the reference image model 1121. The training data 1123 includes a training input image that is acquired in advance. The training data 1123 also includes a new input image that is acquired by the image acquirer 1130.

The image acquirer 1130 acquires an image used to train the target image model 1122. For example, the image acquirer 1130 includes a camera sensor, and the camera sensor is configured to capture an external appearance of a device (for example, an autonomous vehicle). The image acquirer 1130 acquires an external image in response to a request from the processor 1110 (for example, in response to a user input being received). However, examples are not limited thereto, and the image acquirer 1130 periodically or continuously acquire an image. Also, the image acquirer 1130 acquires an input image for training through a communication (for example, a wireless communication or a wired communication) with an external device (for example, an arbitrary server).

In addition to operations of one or more of the neural network processing apparatuses and/or operations described in FIGS. 1-11 as noted above, the memory 1120 may further store instructions which, when executed by processor 1110, cause the processor 1110 to perform additional operations, functions, and controls of the image model building apparatus 1100, such as a user interface of the image model building apparatus 1100.

The image model building apparatus 1100 may be connected to an external device, for example, a personal computer (PC) or a network, via an input/output device of the electronic system, to exchange data with the external device. The image model building apparatus 1100 may be implemented in various electronic devices, as only non-limiting examples, a mobile device, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, various Internet of Things (IoT) devices, or any other device capable of wireless communication or network communication consistent with that disclosed herein.

The image model building apparatuses 1000 and 1100, and other apparatuses, units, modules, devices, and other components described herein with respect to FIGS. 10 and 11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 4, 6 and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of building an image model. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory, such as, a multimedia card, a secure digital (SD) card or a extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of building an image model, the method comprising:
generating a target image model comprising an additional layer connected to a layer located on an input side of remaining layers in the target image model, wherein the remaining layers are same as layers of a reference image model, and the target image model and the reference image model include a neural network;
performing a first training for the additional layer of the target image model based on a difference between feature data output from at least a portion of layers of the reference image model and feature data output from at least a portion of layers of the target image model; and
in response to a completion of the first training of the additional layer, performing a second training for all layers of the target image model based on the reference image model, the all layers of the target image model including the additional layer and the remaining layers.

2. The method of claim 1, wherein the generating of the target image model comprises generating the target image model by connecting the additional layer to a layer located on an input side of the remaining layers in the target image model.

3. The method of claim 1, wherein the generating of the target image model comprises initializing the additional layer by assigning a random value to each nodes of the additional layer.

4. The method of claim 1, wherein the training of the additional layer comprises:
determining a reference model output from an image with a converted training input, based on the reference image model; and
training the target image model based on the reference model output.

5. The method of claim 4, wherein the determining of the reference model output comprises:
generating a conversion image by converting the training input based on an input layer of the reference image model; and
computing the reference model output from the conversion image.

6. The method of claim 1, wherein the training of the additional layer comprises training the target image model based on a reference model output and a target model output that are based on the reference image model and the target image model, respectively.

7. The method of claim 6, wherein the training of the additional layer comprises:
computing an error based on the reference model output and the target model output; and
updating a parameter of at least a portion of the remaining layers and the additional layer in the target image model based on the computed error.

8. The method of claim 7, wherein the updating of the parameter comprises repeating updating of the parameter until an error between the reference model output and the target model output converges.

9. The method of claim 1, wherein the training of the additional layer comprises updating a parameter of the additional layer.

10. The method of claim 1, wherein the training of the additional layer comprises updating a parameter of the additional layer while maintaining parameters of the remaining layers in the target image model.

11. The method of claim 1, wherein the generating of the target image model comprises:
generating the remaining layers of the target image model by duplicating parameters and a layer structure of the reference image model; and
connecting the additional layer to the remaining layers.

12. The method of claim 1, further comprising:
updating parameters of the remaining layers and the additional layer in the target image model, in response to the completion of the first training of the additional layer.

13. The method of claim 1, wherein a number of nodes in the additional layer is greater than or equal to a number of nodes in one of the layers of the reference image model and is less than or equal to a number of nodes in an input layer of the target image model.

14. The method of claim 1, further comprising:
acquiring an input image;
determining a label of the input image; and
additionally training the target image model based on the input image and the label.

15. The method of claim 14, wherein the determining of the label comprises determining the label based on a user input associated with the acquiring of the input image.

16. The method of claim 1, further comprising:
generating an additional image model comprising an additional layer connected to the target image model, in response to a completion of the first training of the target image model; and
training the additional layer of the additional image model based on an output of the target image model.

17. The method of claim 1, wherein the target image model is configured to receive an image with a resolution higher than an input resolution of the reference image model.

18. The method of claim 1, wherein the training of the additional layer comprises training the additional layer based on feature data output from at least a portion of the layers of the reference image model and feature data output from at least a portion of the remaining layers of the target image model.

19. The method of claim 5, wherein the resolution of the image is greater than a resolution of the conversion image.

20. The method of claim 1, wherein a number of nodes in the additional layer is greater than a number of nodes in any of the layers of the reference image model.

21. A non-transitory computer-readable storage medium storing instructions that, when executed by a processor, cause the processor to perform the method of claim 1.

22. An apparatus for building an image model, the apparatus comprising:
a processor configured to:
generate a target image model that comprises an additional layer connected to a layer located on an input side of remaining layers in the target image model, wherein the remaining layers are same as layers of a reference image model, and the target image model and the reference image model include a neural network;
perform a first training for the additional layer of the target image model based on a difference between feature data output from at least a portion of layers of the reference image model and feature data output from at least a portion of layers of the target image model; and in response to a completion of the first training of the additional layer, perform a second training for all layers of the target image model based on the reference image model, the all layers of the target image model including the additional layer and the remaining layers; and a memory configured to store the trained target image model.

* * * * *